United States Patent
Hirth et al.

(10) Patent No.: US 9,476,332 B2
(45) Date of Patent: Oct. 25, 2016

(54) DEVICE FOR TREATING A GAS STREAM FLOWING RADIALLY OUTWARDLY FROM A CENTRAL AREA

(71) Applicant: EMITEC GESELLSCHAFT FUER EMISSIONSTECHNOLOGIE MBH, Lohmar (DE)

(72) Inventors: Peter Hirth, Roesrath (DE); Jan Hodgson, Troisdorf (DE); Christian Vorsmann, Cologne (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 240 days.

(21) Appl. No.: 14/474,461

(22) Filed: Sep. 2, 2014

(65) Prior Publication Data

US 2014/0366736 A1    Dec. 18, 2014

Related U.S. Application Data

(63) Continuation of application No. PCT/EP2013/053840, filed on Feb. 26, 2013.

(30) Foreign Application Priority Data

Mar. 2, 2012 (DE) .................. 10 2012 004 270

(51) Int. Cl.
*F01N 3/01* (2006.01)

(52) U.S. Cl.
CPC ............ *F01N 3/01* (2013.01); *F01N 2240/04* (2013.01); *F01N 2490/16* (2013.01); *Y02T 10/20* (2013.01)

(58) Field of Classification Search
CPC combination set(s) only.
See application file for complete search history.

(56) References Cited

U.S. PATENT DOCUMENTS

| 4,313,739 A | * | 2/1982 | Douglas-Hamilton | B01D 53/323 |
| | | | | 95/79 |
| 4,811,559 A | * | 3/1989 | Henkel | F01N 3/027 |
| | | | | 55/466 |
| 5,141,714 A | * | 8/1992 | Obuchi | B01D 39/20 |
| | | | | 422/169 |

(Continued)

FOREIGN PATENT DOCUMENTS

| DE | 1170375 B | 5/1964 | |
| DE | 2608843 A1 | * 9/1977 | ............... F01N 3/28 |

(Continued)

*Primary Examiner* — Duane Smith
*Assistant Examiner* — Sonji Turner
(74) *Attorney, Agent, or Firm* — Laurence A. Greenberg; Werner H. Stemer; Ralph E. Locher

(57) ABSTRACT

A device for treating a gas stream, especially an exhaust-gas stream of an internal combustion engine, includes at least one radial chamber radially conducting the gas stream and extending substantially radially from a central region to an outer collecting chamber. First and second, preferably parallel, substantially disk-shaped walls delimit the chamber. Electrodes project from the first wall into the chamber. The first wall is formed of electrically insulating material having the electrodes fastened therein and electrically interconnected by electrical conductors in or on the insulating material. Two or more chambers may be disposed, axially in series, around the central region. Very effective treatment of exhaust gas with an electric field for ionization or generating a plasma can be provided over a relatively short structural length in a flow direction. Electric fields running transversely to the flow direction provide new possibilities for selecting various parameters of the treatment device.

10 Claims, 2 Drawing Sheets

(56) References Cited

U.S. PATENT DOCUMENTS

| | | | | |
|---|---|---|---|---|
| 5,484,575 A | * | 1/1996 | Steenackers | B01D 53/9454 422/169 |
| 5,557,923 A | * | 9/1996 | Bolt | B03C 3/0175 55/466 |
| 5,571,298 A | * | 11/1996 | Buck | B01D 39/12 422/174 |
| 7,074,370 B2 | * | 7/2006 | Segal | B01D 53/945 204/177 |
| 7,473,288 B2 | * | 1/2009 | Toyoda | C10L 1/1208 55/282.2 |
| 7,473,291 B2 | * | 1/2009 | Evenstad | B01D 45/08 55/329 |
| 8,628,606 B2 | | 1/2014 | Hodgson et al. | |
| 2006/0144236 A1 | * | 7/2006 | Le Boucq De Beaudignies | B03C 3/025 96/30 |
| 2008/0066621 A1 | * | 3/2008 | Naito | B01D 46/0063 96/55 |
| 2010/0003171 A1 | * | 1/2010 | Samaras | B01D 53/9454 422/176 |
| 2011/0115415 A1 | | 5/2011 | Hong | |
| 2012/0186447 A1 | * | 7/2012 | Hodgson | F01N 3/0275 95/79 |
| 2013/0255231 A1 | | 10/2013 | Hodgson et al. | |

FOREIGN PATENT DOCUMENTS

| | | | | |
|---|---|---|---|---|
| DE | 102010051655 A1 | | 5/2012 | |
| FR | 2841484 A1 | | 1/2004 | |
| FR | 2843611 | * | 2/2004 | F01N 3/01 |
| FR | 2915234 A1 | | 10/2008 | |
| JP | H03262551 A | | 11/1991 | |
| WO | 2011029728 A1 | | 3/2011 | |

* cited by examiner

DEVICE FOR TREATING A GAS STREAM FLOWING RADIALLY OUTWARDLY FROM A CENTRAL AREA

CROSS-REFERENCE TO RELATED APPLICATION

This is a continuation, under 35 U.S.C. §120, of copending International Application No. PCT/EP2013/053840, filed Feb. 26, 2013, which designated the United States; this application also claims the priority, under 35 U.S.C. §119, of German Patent Application DE 10 2012 004 270.1, filed Mar. 2, 2012; the prior applications are herewith incorporated by reference in their entirety.

BACKGROUND OF THE INVENTION

Field of the Invention

The present invention relates to the treatment of a gas stream, in particular an exhaust-gas stream of an internal combustion engine, for example of a motor vehicle. Such devices are generally used for the treatment, in particular for the purification, of gas streams. The present invention relates primarily to the elimination of particles, for example soot particles, from the exhaust gas of an internal combustion engine, in particular of a diesel engine. Increasingly stringent limit values for the number and mass of soot particles that may be discharged to the atmosphere by a motor vehicle per unit of weight of exhaust gas or per unit of exhaust-gas volume necessitate increasingly improved exhaust-gas purification systems.

Numerous different concepts for eliminating soot particles from exhaust gases of mobile internal combustion engines already exist. Aside from alternately closed-off wall-flow filters, open bypass flow filters, gravity-driven separators, etc., systems have also already been proposed in which the particles in the exhaust gas are electrically charged and then deposited with the aid of electrostatic attraction forces. Those systems are known, in particular, under the name "electrostatic filters" or "electrofilters."

In the case of "electrofilters," an agglomeration of small soot particles to form larger soot particles and/or electrical charging of soot particles are effected through the provision of an electric field and/or a plasma. Electrically charged soot particles and/or relatively large soot particles are generally much easier to separate out in a filter system. Soot particle agglomerates, due to their relatively high mass inertia, are transported more inertly in an exhaust-gas flow and thus accumulate more easily at diversion points of an exhaust-gas flow. Electrically charged soot particles, due to their charge, are drawn towards surfaces on which they accumulate and dissipate their charge. That, too, facilitates the removal of soot particles from the exhaust-gas flow during the operation of motor vehicles. The present invention also lies in that field.

In order to influence particles in an exhaust gas using electric fields, it is necessary for the particles to remain in, or move through, the electric field over a certain length of time. In the case of the electric fields that are typically used for geometric reasons and which lie in the flow direction or counter to the flow direction of the exhaust gas, it is not always possible to achieve a high probability of ionization of particles flowing through.

SUMMARY OF THE INVENTION

It is accordingly an object of the invention to provide a device for treating a gas stream flowing radially outwardly from a central area, which overcomes the hereinaforementioned disadvantages of and alleviates or solves the problems that arise in relation to the heretofore-known devices of this general type. In particular, it is sought to specify a configuration for the treatment of a gas stream, in which configuration the gas stream to be treated flows substantially perpendicular to an electric field.

With the foregoing and other objects in view there is provided, in accordance with the invention, a device for the treatment of a gas stream, in particular an exhaust-gas stream of an internal combustion engine, comprising at least one radial chamber through which the gas stream can flow radially and which extends (substantially) radially from a central region to an outer collecting chamber, the radial chamber being delimited by a first (approximately) disk-shaped wall and a second (approximately) disk-shaped wall, and a multiplicity of electrodes directed into the radial chamber and projecting from the first wall.

In this case, "radially" should be understood to mean that the direction runs approximately perpendicularly (for example also with a deviation of +/−15°) with respect to a central axis of the device. This means, in particular, that the gas stream flows in the device, and/or into/out of the device, substantially along the central axis, and is then diverted in a lateral/transverse direction. The radial chamber is, in particular, formed around a section of the central axis. The radial chamber may also widen and/or narrow radially, although it is preferable for the two walls to be (substantially) uniformly spaced apart in a radial (and circumferential) direction. In particular, the (approximately) disk-shaped form of the walls means that they are flat, and in particular also circular. Therefore, in particular, a radial chamber is formed which extends in the radial direction and, with uniform width, in the circumferential direction around the central axis/the central chamber.

In this way, an electric field can be built up between the electrodes, which are provided, in particular, only on the first wall, and the second wall (in particular without electrodes), with the gas stream to be treated flowing through the electrical field transversely with respect to the field direction. The gas stream can be slowed by the diversion of the gas stream and/or by the enlarged flow cross section in relation to the central region. Particles flowing through the radial chamber are exposed to an approximately constant electrical field, or a flow of electrons, for a relatively long period of time, and the possibility of ionization arises repeatedly on the path from the inside to the outside.

In accordance with another feature of the invention, the first disk-shaped wall and the second disk-shaped wall preferably run (substantially) parallel to one another, whereby the speed of the gas stream decreases from the inside to the outside, whereas the spacings, which co-determine the electric field, between the electrodes and the second wall, remain approximately uniform.

In accordance with a further preferred feature of the invention, the first disk-shaped wall is formed from an electrically insulating material with electrically conductive electrodes fastened therein, and the electrodes are electrically connected to one another by an electrical conductor that runs in or on the electrically insulating material. In this way, all of the electrodes can be set to the same electrical potential. The electrodes are preferably in the form of pins with tips that project into the radial chamber by 0.1 to 3 mm [millimeters], preferably by approximately 1 mm. The tips can lead to corona discharges if an adequately intense electric field is built up. At even higher voltages, plasma discharges occur, which can likewise be used in the context of the present invention.

In accordance with an added feature of the invention, depending on the volume flow rate per unit of time of the exhaust gas/gas stream to be treated, it is possible for two or more radial chambers that run parallel to be disposed, axially in series, around the central region. The exhaust gas is then distributed from the central region into the different radial chambers, wherein the individual radial chambers have a substantially identical form. In this case, embodiments with up to at most 20 annular chambers, in particular with 2, 3, 4, 5 or 6 radial chambers, are preferable.

In accordance with an additional preferable feature of the invention, the density of the electrodes per unit area on the first wall varies in the radial direction, in particular decreases from the inside toward the outside. The density of the electrodes per unit area, for example 0.1 to 5 per $cm^2$ [square centimeter], on the first wall may be constant. However, if one takes into consideration that the speed of the gas stream in the radial chamber is greater at the inside than at the outside, then it is also possible to realize an adaptation of the density of the electrodes per unit area to the flow speed, that is to say the density of the electrodes can decrease from the inside toward the outside. There are, however, also applications in which it is specifically sought for exhaust gas flowing more slowly to be treated more intensively, which can be achieved by providing an electrode density that increases toward the outside.

In accordance with yet another feature of the invention, for the operation of the device, the electrodes and the second disk-shaped wall can be connected to a high-voltage source in such a way that an electric field can be generated between the electrodes and the second wall. In this case, it is possible in particular for the second wall to be produced from an electrically conductive material, in particular metal, and to preferably be electrically connected to ground, for example through a housing. A negative high voltage is then preferably applied to the electrodes, in such a way that they act as cathodes.

In accordance with yet a further preferred feature of the invention, all of the radial chambers are disposed around a common, central gas feed, which is equipped with inner openings issuing into the radial chambers, and are surrounded at the outside by a common housing that delimits the collecting chamber. The collecting chamber is then preferably (directly) connected to the outlet line. In other words, this means in particular that all of the radial chambers are disposed around a common central gas feed that has openings issuing into the radial chambers. In the simplest case, the central gas feed may be a pipe that is provided with holes in line with the respective radial chambers. Furthermore, the radial chambers are surrounded at the outside, at a spacing, by a common housing that delimits the collecting chamber, wherein the collecting chamber is preferably connected to an outlet line through which the treated gas is discharged, in particular for further treatment.

In accordance with yet an added feature of the invention, the respective first wall and the second wall of two or more radial chambers are disposed in a common (substantially) cylindrical holder which ensures a secure hold and a uniform spacing. In particular, the first wall and the second wall are disposed in each case in an alternating configuration in such a way that two (2) first walls or two (2) second walls are formed together as a common first wall or second wall, respectively. Two adjacent radial chambers are thus, in effect, formed mirror-symmetrically with respect to a common wall between the two radial chambers. The question as to whether or not two identical walls that bear, back-to-back, against one another will be combined to form one wall should be decided on the basis of structural and manufacturing considerations. In the case of the second walls, a common wall will generally be expedient. In the case of first walls that bear against one another, this is dependent on manufacturing considerations and possibly on the thermal expansions that must be allowed for.

According to the invention, the supply of electricity to the electrodes may also be realized in different ways.

In accordance with yet an additional feature of the invention, it is preferable for at least one electrical supply line of the electrodes to be guided in an electrically insulated fashion through the housing to the outside.

In accordance with a concomitant feature of the invention, all of the second walls can be connected to (electrical) ground, (in particular) by virtue of the second walls being connected to the central gas feed and/or to the housing.

What is preferred is a substantially radial, electrically insulating leadthrough through the housing, wherein the electrodes of multiple first walls may either be connected to one another in the interior of the housing or provided with separate supply lines that lead through the housing. An alternative proposal is an electrical supply line in an axial direction, that is to say parallel to the central gas feed, wherein the electrically insulating leadthrough through a metallic housing is dispensed with, or at any rate simplified, because the electrical supply line can be led perpendicularly out of the first wall.

The second wall may likewise be connected through an electrical supply line to a voltage source, but as already mentioned, the wall is however preferably electrically connected to the housing, and preferably to the vehicle ground, through components that are provided in any case for holding the second wall.

Other features which are considered as characteristic for the invention are set forth in the appended claims, noting that the features specified individually in claims may be combined with one another in any desired technologically expedient manner and form further embodiments of the invention.

Although the invention is illustrated and described herein as embodied in a device for treating a gas stream flowing radially outwardly from a central area, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
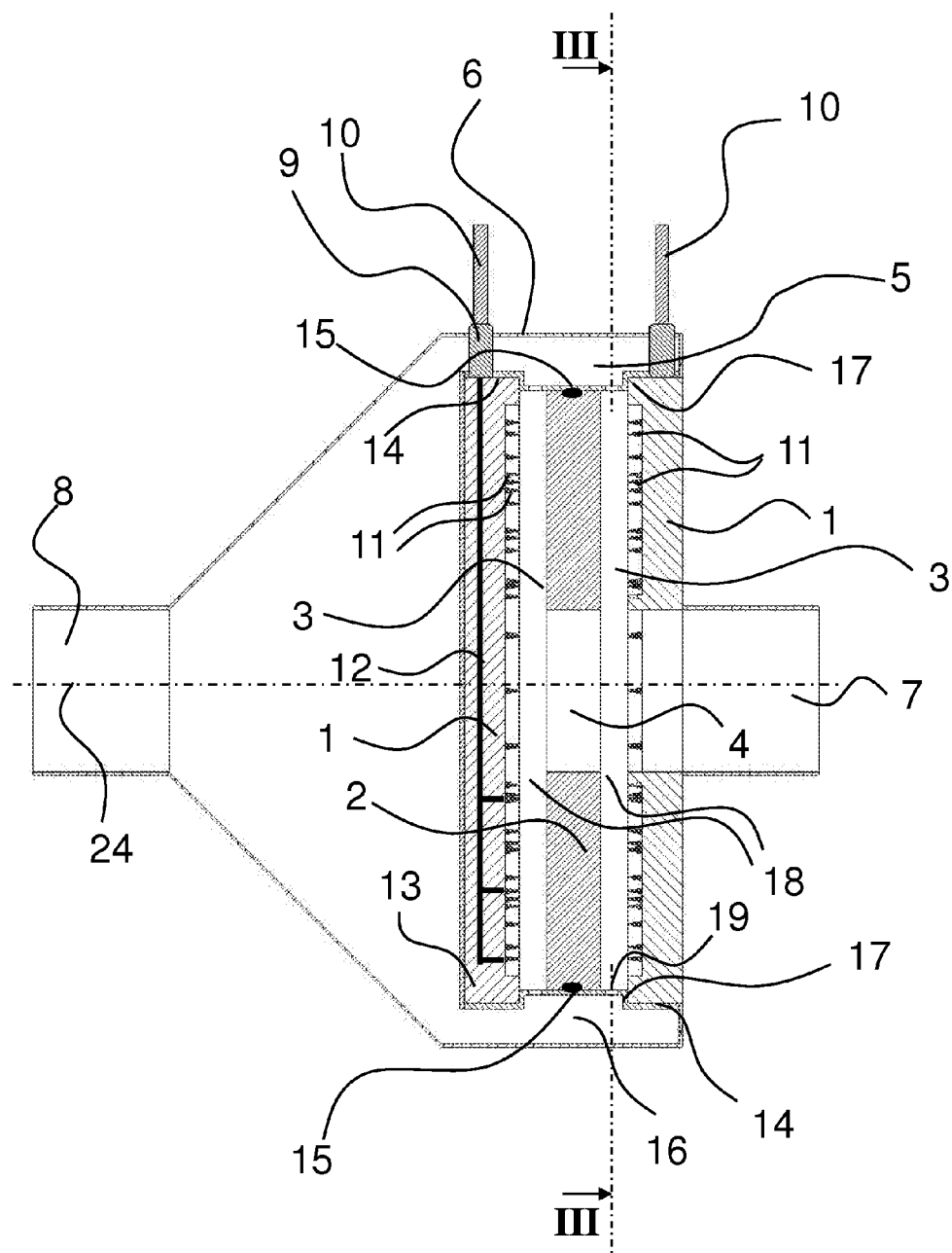
FIG. 1 is a diagrammatic, longitudinal-sectional view of a treatment device according to the invention.

Referring now to the figures of the drawings in detail and first, particularly, to FIG. 1 thereof, there is seen an exemplary embodiment of a treatment device according to the invention. The exemplary embodiment includes two first walls 1, radial chambers 3 disposed mirror-symmetrically with respect to one another and a common second wall 2 disposed between the radial chambers 3. The gas to be treated is fed through a central gas feed 7 into a central region 4 (along a central axis 24), from which the gas flows through inner openings 18 into the radial chambers 3. At the outside, the gas flows through outer openings 19 into a collecting chamber 5 that is delimited by a housing 6. In the housing 6, the gas is guided to an outlet line 8, which is preferably disposed in alignment with the central gas feed 7. In this way, the entire device can be installed easily into an exhaust system, similarly to other treatment devices. Each radial chamber 3 is delimited by a first wall 1 and a second wall 2 with the first wall 1 having electrodes 11 that are electrically connected to one another through electrical conductors 12. The electrical conductors 12 run, for example in the manner of a grate, within the first wall 1 or on the surface thereof, with the first wall 1 being preferably formed from electrically insulating material 13. The electrical conductors 12 and the electrodes 11 may, in particular, be cast into electrically insulating material 13. The electrodes 11 and the electrical conductors 12 can be connected to a non-illustrated high-voltage source through at least one radial electrical supply line 10, which is guided through the housing 6 to the outside by an electrically insulated lead-through 9.

In the present exemplary embodiment, the two first walls 1 and the second wall 2 are held with fixed spacings to one another by using a cylindrical holder 14. In this case, the second wall 2 may preferably be fastened to the cylindrical holder 14 by using welded connections 15, whereas the first walls 1 are held at a spacing from the second wall 2 by using at least one support shoulder 17 in each case. Due to the different thermal expansion characteristics of metal and ceramic, the region of the cylindrical holder 14 is configured as an expansion compensation facility 16.

Figure 2:
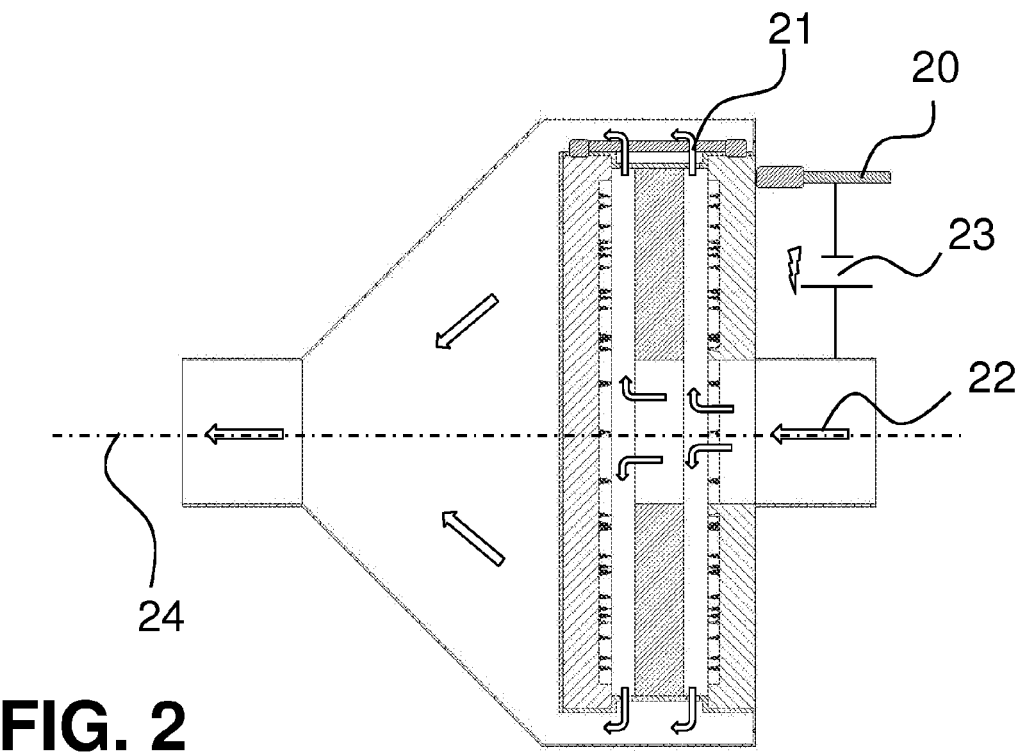
FIG. 2 is a longitudinal-sectional view of another exemplary embodiment on a reduced scale.

FIG. 2 shows substantially the same configuration as FIG. 1, but with a different electrical supply line 20 and an internal electrical connection 21 between the electrical conductors 12 in the two first walls 1. A gas stream 22 is also indicated by arrows. A high-voltage source 23 serves for the supply of a high voltage to the electrodes.

Figure 3:
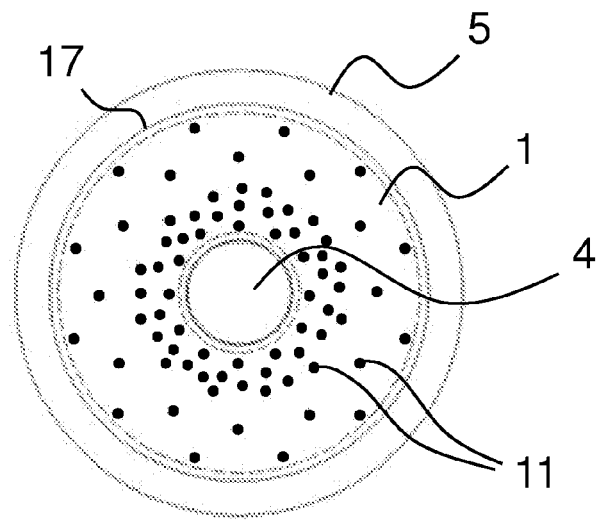
FIG. 3 is a cross-sectional view through a radial chamber of FIG. 1, which is taken along a line III-Ill in the direction of the arrows and on a reduced scale.

FIG. 3 shows a diagrammatic cross section through the treatment device, specifically with a view directed toward a first wall 1 with its electrodes 11. In this exemplary embodiment, the density of the electrodes 11 per unit area decreases toward the outside.

By way of precaution, it is pointed out that the technical details from one figure may also be considered in isolation or combined with other technical details from other figures. Where, in this case, a combination of features has not explicitly been designated as being (technically) imperative, a person skilled in the art may make corresponding modifications without departing from the construction of the device proposed herein, or the function thereof.

The present invention can, over a relatively short structural length in a flow direction, provide very effective treatment of an exhaust gas with an electric field for ionization or for the generation of a plasma. Through the use of electric fields that run transversely with respect to the flow direction, new possibilities are opened up for the selection of various parameters of the treatment device.

The invention claimed is:

1. A device for treating a gas stream, the device comprising:
    a central region;
    an outer collecting chamber;
    a first disk-shaped wall and a second disk-shaped wall;
    at least one radial chamber through which the gas stream can flow radially, said at least one radial chamber extending radially from said central region to said outer collecting chamber and being delimited by said first and second disk-shaped walls; and
    a multiplicity of electrodes projecting from said first wall and directed into said at least one radial chamber.

2. The device according to claim 1, wherein said first disk-shaped wall and said second disk-shaped wall are mutually parallel.

3. The device according to claim 1, wherein said first disk-shaped wall is formed of an electrically insulating material having said electrically conductive electrodes fastened therein, and electrical conductors run in or on said electrically insulating material and interconnect said electrically conductive electrodes.

4. The device according to claim 1, wherein said at least one radial chamber includes at least two parallel radial chambers disposed axially in series around said central region.

5. The device according to claim 1, wherein said electrically conductive electrodes have a density per unit area on said first wall varying in radial direction.

6. The device according to claim 1, wherein said electrically conductive electrodes and said second disk-shaped wall are configured to be connected to a high-voltage source to generate an electrical field between said electrically conductive electrodes and said second wall.

7. The device according to claim 1, which further comprises:
    a central gas feed;
    said at least one radial chamber including a plurality of radial chambers disposed in common around said central gas feed;
    said central gas feed having inner openings issuing into said radial chambers; and
    a housing outwardly surrounding said radial chambers in common and delimiting said collecting chamber.

8. The device according to claim 1, which further comprises:
    a cylindrical holder;
    said at least one radial chamber including at least two radial chambers; and
    said first wall and said second wall of said at least two radial chambers being disposed in common in said cylindrical holder with two first walls or two second walls together forming a common first wall or second wall.

9. The device according to claim 7, which further comprises at least one electrical supply line supplying said electrically conductive electrodes and being guided in an electrically insulated manner outwardly through said housing.

10. The device according to claim 7, wherein all of said second walls are configured to be connected to ground by being electrically connected to at least one of said central gas feed or said housing.

* * * * *